United States Patent [19]

Maurice

[11] Patent Number: 4,919,084

[45] Date of Patent: Apr. 24, 1990

[54] POULTRY BROODER PILOT BURNER

[76] Inventor: Paul E. Maurice, 14 Fontaine St., Ludlow, Mass. 01056

[21] Appl. No.: 97,632

[22] Filed: Sep. 16, 1987

[51] Int. Cl.⁵ ............................................. A01K 31/18
[52] U.S. Cl. ....................................... 119/32; 237/14
[58] Field of Search .................... 119/30, 31, 32, 34, 119/35; 431/154, 278, 352, 353, 354, 355; 126/92 R, 92 AC, 92 B

[56] References Cited

U.S. PATENT DOCUMENTS

| | | | |
|---|---|---|---|
| 842,887 | 2/1907 | Homan | 431/355 |
| 1,875,394 | 9/1932 | Richford | 431/355 |
| 1,929,088 | 10/1933 | Wood . | |
| 2,051,213 | 8/1936 | Hamilton . | |
| 2,240,571 | 5/1941 | Olson . | |
| 2,361,097 | 10/1944 | Hess . | |
| 2,941,363 | 6/1960 | Cuny et al. | 431/353 |
| 2,985,137 | 5/1961 | Horne . | |
| 3,027,888 | 4/1962 | DuFault . | |
| 3,429,306 | 2/1969 | Thompson | 119/32 |
| 3,503,379 | 3/1970 | Kuhn . | |
| 3,505,976 | 4/1970 | Miller | 119/32 |
| 3,765,610 | 10/1973 | Schell | 119/32 X |
| 3,802,829 | 4/1974 | Morris | 431/353 |
| 3,849,058 | 11/1974 | Pankow | 431/353 X |
| 3,926,172 | 12/1975 | Saponara . | |
| 3,976,243 | 8/1976 | Christophel . | |
| 3,992,137 | 11/1976 | Streisel | 431/278 |
| 4,125,357 | 11/1978 | Kristen . | |
| 4,144,832 | 3/1979 | Dahl . | |
| 4,177,034 | 12/1979 | Tones | 431/343 X |
| 4,278,423 | 7/1981 | Siccardi . | |
| 4,369,030 | 1/1983 | Siccardi . | |
| 4,524,722 | 6/1985 | Siccardi . | |
| 4,597,733 | 7/1986 | Dean et al. | 431/278 X |
| 4,614,166 | 9/1986 | Maurice . | |
| 4,658,758 | 4/1987 | Maurice . | |

Primary Examiner—Gene Mancene
Assistant Examiner—R. Thomas Price

[57] ABSTRACT

A poultry brooder pilot burner is provided wherein a pilot body removably mounts onto a mounting and attachment stud under pressure of a spring washer. Inwardly projecting pins traverse flat areas of the mounting stud to enter a circumferential channel and, upon rotating the pilot body, engage detents under pressure of the spring washer to secure the removable pilot body in place. A safety circuit thermocouple is disposed above and to the side of the pilot burner such that the thermocouple detects only such pilot flame as is capable of igniting the main gas burner.

36 Claims, 4 Drawing Sheets

POULTRY BROODER PILOT BURNER

TECHNICAL FIELD

The present invention relates to the field of poultry brooders and, more particularly, to an improved pilot burner for a poultry brooder.

BACKGROUND AND OBJECTS OF THE INVENTION

Poultry brooders are used in poultry houses to provide heat and radiant energy in order to keep chicks warm and disease free and to keep the poultry house floor dry.

A typical poultry brooder of the type pertaining to this invention has a ceramic radiant element disposed over a thermostatically controlled gas burner so that the flame and heated gases from the gas burner impinge upon and heat the ceramic radiant. During one cycle of operation the controlling thermostat activates a gas source to supply fuel gas to the main gas burner ignited by an adjacent pilot burner. The main burner remains on until the desired temperature is reached, at which time the thermostatic control terminates the supply of gas to the burner to extinguish the main burner. The pilot burner, on the other hand, remains lit at all times. A poultry brooder generally in accordance with the foregoing description is shown and described in U.S. Letters Patent Nos. 4,614,166 and 4,658,758 issued to Paul E. Maurice.

As previously stated, one goal of the poultry farmer is to keep the chicks and poultry house floor warm and dry. However, since dry feed, feathers and excrement accumulate on the dry dirt poultry house floor and may become airborne with movement of the chicks, the poultry house can become a remarkably dusty environment. Although airborne dust and other particles (hereinafter "dust") generally do not detract from the performance of the main gas burner, the extreme dust conditions in a poultry house can and do affect performance of the pilot burner.

Poultry brooder pilot burners typically have a small orifice on the order of 0.009 to 0.018 inches in diameter mounted in an orifice holder which, in turn, is mounted in a support structure adjacent to the main gas burner. Typically, the orifice is threaded into corresponding threads in the orifice holder which is coupled via a threaded coupling to a gas line. In the poultry brooder shown and described in the foregoing U.S. Pat. No. 4,614,166, as sold by Safe-glo Products of Springfield, Mass., a horizontally mounted pilot burner has a vertical orifice surface and a fixedly mounted pilot burner body for conveying the pilot flame to the main gas burner. In other types of poultry brooders, such as brooders sold by Shenandoah Manufacturing Co., Inc. of Harrisonburg, Va., the pilot burner is vertically mounted adjacent to the main gas burner. In this latter arrangement the orifice surface is horizontal. As will be readily appreciated, a horizontal orifice is highly susceptible to the accumulation of dust on or in the orifice which can often clog the orifice and extinguish the pilot flame. In view of this known drawback, the pilot burner barrel of the foregoing Shenandoah poultry brooder is not firmly attached in any way to the pilot burner support structure. Rather, the rectangular pilot barrel is inserted through a corresponding opening in one metal plate and simply stands vertically on the horizontal pilot burner support surface surrounding the orifice holder. This structure suffers from the additional drawback that the loose pilot barrel is susceptible to being accidentally displaced and, therefore, is of limited value.

When a poultry brooder pilot burner becomes clogged, as by dust becoming lodged in the orifice, the pilot burner eventually becomes unable to ignite the main burner. The pilot burner flame gradually diminishes and the orifice must then be cleaned and/or replaced. Briefly stated, there are two ways to clean and/or replace the orifice.

First, the poultry farmer can attempt to clear the orifice from the "front" or flame side. Where the pilot burner is vertically mounted with a pilot barrel loosely resting on the surrounding support surface this can be accomplished by lifting away the loose pilot barrel and cleaning the orifice either by passing a finger across the orifice surface or inserting a fine wire into the orifice itself. However, the horizontal orifice in a vertical pilot burner is more susceptible to clogging and a loose barrel on vertical pilot burner is prone to being accidentally knocked over. Therefore, these configurations are of limited value.

In the generally preferred configuration wherein the pilot burner is horizontally mounted and necessarily has a fixed pilot barrel, the orifice surface is not readily accessible from the front and this technique is not helpful. In a horizontal pilot burner the poultry farmer can only attempt to clean the orifice from the front to the extent the orifice can be reached through air apertures, if any, provided in the pilot body.

Secondly, the poultry farmer can disassemble the orifice holder from the rear to clean or, where necessary, replace the orifice. Accessing the orifice in this manner becomes necessary when the orifice cannot be cleaned from the front surface, either because the clog in a vertical pilot burner is too severe or because the front of the orifice is not readily accessible for cleaning, as in the preferred horizontally mounted pilot burner wherein the fixed barrel precludes full access to the front of the orifice.

Unfortunately, dismantling the orifice holder requires that the gas source be shut off and that the orifice holder be disconnected from the gas line and pilot burner support using tools, such as one or more wrenches and/or pliers. During reassembly, all gas couplings must be checked for leaks. As will be readily appreciated, accessing the orifice in this manner is inconvenient and time consuming and detracts from the poultry farmer's ability to perform other chores.

In a related problem, it has been observed that as the orifice of a poultry brooder pilot burner becomes clogged, the intensity and effectiveness of the pilot flame diminish gradually. That is, the failure of the pilot flame due to orifice clogging is a gradual deterioration over time and not a sudden occurrence. Given the inherent hazards of fuel gas, Poultry brooders are commonly provided with a safety circuit which is designed to cut off the gas supply and override a thermostatic command to ignite the main burner where a pilot burner failure is detected. To this end, a thermocouple is provided at the pilot burner to detect the presence or absence of a pilot flame. Should the pilot burner thermocouple fail to detect the presence of a pilot flame the safety circuit will prevent any attempt to light the main burner. It has been found, however, that as the pilot flame gradually diminishes during clogging the flame often becomes too weak to ignite the main burner but still strong enough to be detected by the thermocouple. Under these circumstances the safety circuit will not be activated and, during a futile attempt to ignite the main burner, latent fuel gas may be permitted to escape into the poultry house. Naturally, this can present hazards of explosion and asphyxiation.

Therefore, it is one object of the present invention to provide a poultry brooder pilot burner in which the orifice is readily accessible for cleaning.

It is a further object of the present invention to provide a poultry brooder pilot burner having a removable pilot burner barrel which is not susceptible to being accidentally displaced from its operational position.

It is another object of the present invention to provide, in a horizontally mounted poultry brooder pilot burner having a desirable vertical orifice surface, a removable pilot burner barrel to facilitate front surface cleaning of the orifice.

It is a further object of the present invention to provide a horizontally mounted poultry brooder pilot burner in which the orifice can be removed without disconnecting fuel gas couplings.

Yet another object of the present invention is to provide an improved poultry brooder having a safety circuit with a thermocouple sensor wherein the thermocouple is configured and dimensioned to sense only a pilot flame sufficient to ignite the main gas burner.

These and other highly desirable and unusual results are accomplished by the present invention in an economical structure which remarkably permits convenient access to the orifice surface for cleaning without any need for the use of tools or disconnection of any gas line couplings.

Objects and advantages of the invention are set forth in part herein and in part will be obvious herefrom, or may be learned by practice with the invention, which is realized and attained by means of the instrumentalities and combinations pointed out in the appended claims.

The invention consists of the novel parts, constructions, arrangements, combinations, steps, and improvements herein shown and described.

SUMMARY OF THE INVENTION

In accordance with the present invention a poultry brooder pilot burner is mounted, preferably in a horizontal configuration, adjacent to the main gas burner of a thermostatically controlled poultry brooder. The pilot burner includes a pilot burner mounting and attachment stud attached to a support surface which, in turn, is mounted to the poultry brooder. The pilot burner stud supports an orifice holder threadably mounted into the pilot burner stud from the rear of the support. In turn, the orifice holder supports an orifice defining member threadably engaging the orifice holder such that the orifice surface is flush or nearly flush with the front edge of the stud when the orifice holder fully engages the stud. A removable pilot burner body mounts over the mounting stud. Preferably, a pair of inwardly projecting pins on the pilot burner body slide over relief areas on the mounting stud to enter a circumferential channel in the mounting stud as the pilot body is longitudinally slid over the mounting stud at an angle displaced from the operative pilot body position. Thereafter, the pilot body is rotated with the pins disposed in the stud channel until the pins enter detents to secure the pilot body in its operative position to the mounting stud. A spring washer is provided between the stud base and the rear edge of the pilot body to urge the pilot body forward, away from the mounting plate and stud, thereby urging the pins into the pin detents to hold the pilot body in its operative position. Advantageously, the present invention permits the pilot burner to be mounted in the preferred horizontal configuration while remarkably also permitting the pilot body to be removed, as necessary.

A pilot burner thermocouple is also provided for detecting the presence or absence of a pilot burner flame. The thermocouple is mounted to and projects from a pilot burner thermocouple support so that the thermocouple is disposed adjacent but not directly over the pilot body. In this manner, the thermocouple only senses the presence of a pilot flame strong enough to ignite a main burner associated therewith but does not sense the presence of a weak pilot flame incapable of igniting a main gas burner. This is accomplished since only a sufficiently large pilot flame protruding from the pilot body capable of igniting the main burner will contact and activate the thermocouple. However, the thermocouple will not falsely detect the presence of a sufficient pilot flame due merely to heat rising from a weak pilot burner flame incapable of igniting the main burner.

During normal operation the poultry brooder pilot burner remains in the fully assembled configuration with the pilot body extending toward the main gas burner so that the flame deflector is disposed immediately adjacent to the gas flow of the main gas burner. As the poultry brooder control, such as a timing or thermostatic control, calls for the main gas burner to be ignited the main burner gas line is turned on and gas flows through the main burner until the pilot flame is encountered near the main burner outlet, whereupon the main gas burner is ignited.

As previously stated, it is not uncommon for the pilot burner orifice to become clogged in the severely dusty conditions of the poultry house. As this occurs the pilot burner flame gradually diminishes to a point where it is insufficient to ignite the main burner. Eventually, the pilot flame may be completely extinguished. Although the thermocouple and associate circuitry should prevent any attempt to ignite the main gas burner, the loss of use of the brooder deprives the chicks of needed warmth and, at the very least, causes a loss of efficiency in the conversion of feed to meat, i.e. the so-called "feed to meat ratio". Thus, it is important that the poultry farmer be able to clear the pilot burner clog as quickly and efficiently as possible.

In the preferred embodiment of the present invention, a poultry brooder pilot burner of the preferred horizontal configuration is provided in which the pilot body is removably secured in place. The horizontal configuration provides the advantage of a vertical orifice less susceptible to clogging than the horizontal orifice found in vertical pilot burners. Remarkably, the removable pilot body permits far more access to the front orifice surface than has heretofore been obtainable in a horizontal pilot burner. This permits the orifice surface to be cleaned from the front in many more instances and reduces the frequency that the orifice holder must be removed from the rear of the pilot burner mounting. In addition, the preferred embodiment wherein the orifice is threadably mounted to the front of the orifice holder and becomes exposed at the front of the stud remarkably permits the orifice to be removed from the orifice holder directly from the front of the stud without disconnecting the orifice holder from the rear of the support plate or the gas line. This feature remarkably provides access to the rear orifice surface and the interior of the orifice holder without disconnecting any gas line couplings. In addition, the preferred spring washer and pilot body pin/detent structure firmly seats the pilot body against accidental removal.

As a further advantage of the present invention the pilot burner thermocouple is placed to the side of the pilot body. Surprisingly, this simple change in position ensures that the thermocouple detects only the presence of a pilot flame sufficient to ignite the main gas burner. As previously explained, in this configuration heat rising from a weak flame incapable of igniting the main gas burner does not cause the thermocouple to falsely sense a proper pilot flame. Thus, a weak pilot flame goes undetected and a system failure is appropriately indicated. During operation, the main gas burner flame also contacts and activates the thermocouple.

Therefore, the poultry brooder pilot burner according to the present invention provides a horizontal pilot burner having a removable pilot burner barrel not susceptible to being accidentally displaced from its operational position. In addition, the present invention advantageously provides a pilot burner thermocouple disposed adjacent but not directly over the pilot flame such that the thermocouple only senses the presence of a pilot flame sufficient to ignite the main burner and will not sense heat from a weak flame not strong enough to ignite the main gas burner.

Therefore, the foregoing objects of the present invention are accomplished in a convenient structure having few components at modest additional cost.

It will be understood that the foregoing general description and the following detailed description are set forth in words and language of example and should not be construed by way of limitation upon the present invention.

BRIEF DESCRIPTION OF THE DRAWINGS

The accompanying drawings, referred to herein and constituting a part hereof, illustrate preferred embodiments of the product of the present invention, and together serve to explain the principles of the invention.

DETAILED DESCRIPTION OF THE PREFERRED EMBODIMENTS

Figure 1:
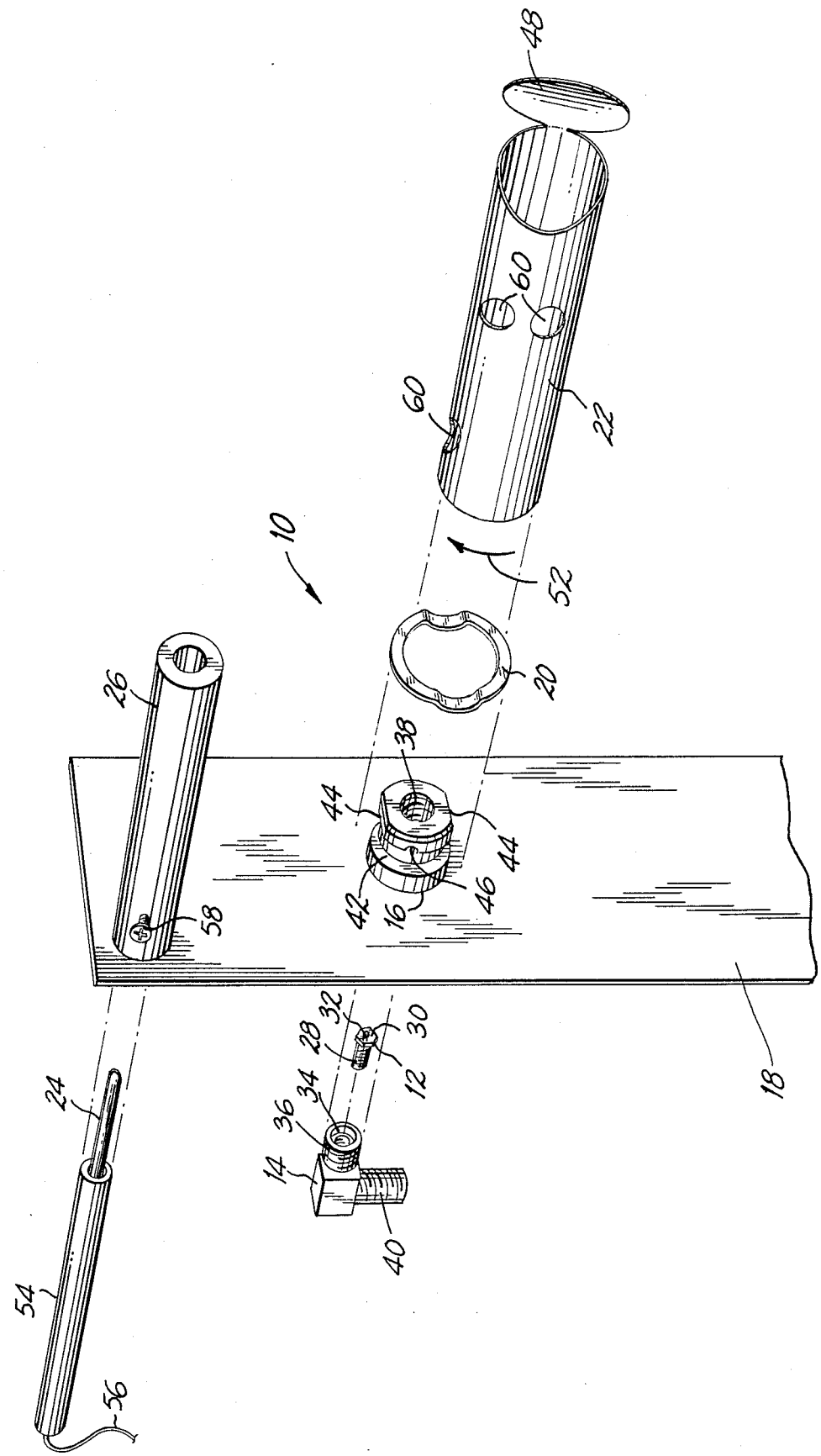
FIG. 1 is an exploded perspective view of a pilot burner constructed in accordance with the present invention.

Referring now to the drawings, there is shown a poultry brooder pilot burner 10 in accordance with the present invention having an orifice 12, an orifice holder 14, a mounting and attachment stud 16 secured to a mounting plate 18, a spring washer 20 and a removable pilot body 22. As part of a safety circuit, a pilot burner thermocouple 24 is provided which is mounted adjacent to but not directly over the pilot burner by a thermocouple mount 26 attached to mounting plate 18.

Referring more specifically to FIG. 1, orifice 12 has threads 28 and an orifice surface 30 with an orifice 32 therethrough. Orifice threads 28 correspond to and engage interior threads 34 on orifice holder 14. Orifice holder 14 is, in turn, provided with external threads 36 which engage interior threads 38 on mounting stud 16 through a concentric aperture provided in the mounting plate. It should be noted that, as used herein, the term "front" refers to the side of mounting plate 18 facing pilot body 22 and the terms "rear" or "back" indicate the side of mounting plate 18 disposed away from the pilot body. Orifice holder 14 is also provided with a coupling 40 adapted to engage a pilot burner gas source (not shown).

Mounting stud 16 is attached to mounting plate 18 and has a threaded open center aligned with a mounting plate aperture in order to threadingly receive the orifice holder inserted from the back of the mounting plate through the aperture into the open stud center. Preferably, mounting stud 16 is generally cylindrical in shape and has a channel 42 around all or part of the circumference thereof. Longitudinal communication with channel 42 from the front of the stud is provided by flat areas 44 equal in depth to the channel itself. Detents 46 are provided in communication with channel 42 but disposed away from relief or flat areas 44. Spring washer 20 mounts around mounting stud 16 against mounting plate 18. Pilot body 22 preferably has a cylindrical barrel configuration with a flame deflector 48 and inwardly projecting pins 50 (see FIG. 4).

As pilot body 22 is longitudinally mounted over stud 16 in a partially rotated position (see FIG. 1), pins 50 traverse flat areas 44 and enter channel 42. Thereafter, pilot body 22 is rotated relative to stud 16 in the direction of arrow 52 until pins 50 engage pin detents 46. Spring washer 20 becomes wedged between mounting plate 18 and the bottom edge of pilot body 22 and urges the pilot body longitudinally away from the mounting plate. Consequently, spring washer 20 urges pins 50 on pilot body 22 into detents 46 to effectively lock the pilot body correctly seated on the mounting stud. Air apertures 60 are provided in the pilot body to facilitate combustion of the pilot burner gas. Thermocouple 24 having a thermocouple base 54 and a thermocouple connector 56 is inserted through thermocouple mount 26. A thermocouple set screw 58 may be adjusted to secure the thermocouple in the desired position adjacent but not directly over the pilot body.

Figure 2:
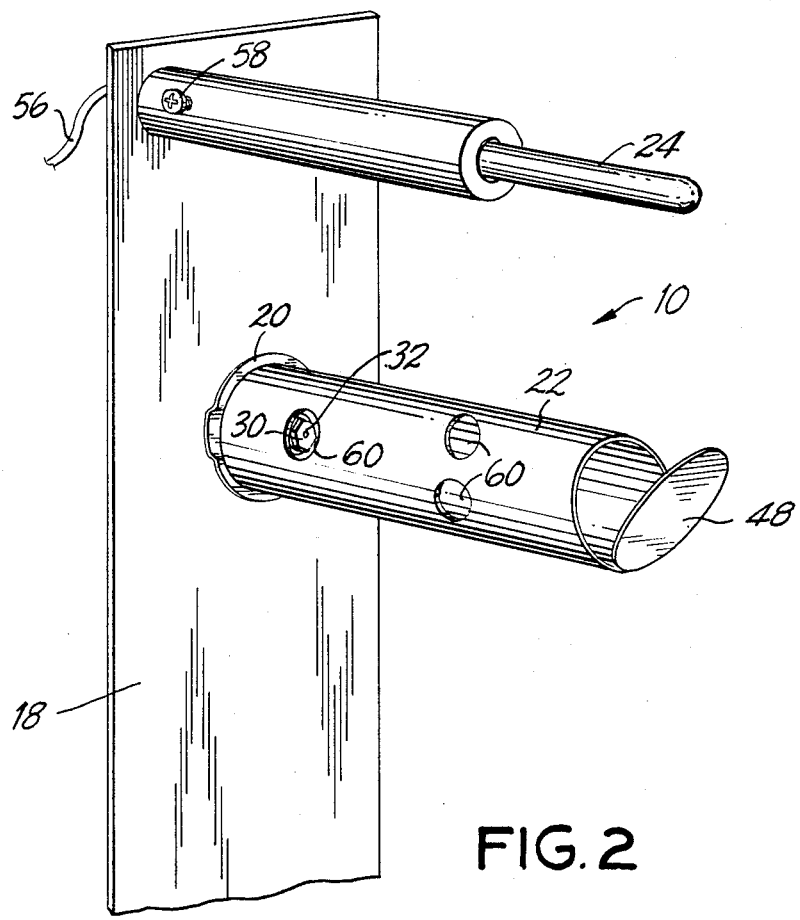
FIG. 2 is a perspective view of a fully assembled pilot burner in accordance with the present invention.

As shown in FIG. 2, when fully assembled the pilot burner has pilot body 22 mounted on stud 16 with flame deflector 48 projecting upwardly and outwardly to direct the pilot flame upward to the main burner and shield the pilot burner from any breeze which might travel down the pilot body to blow out the pilot flame. Spring washer 20 is compressed between pilot body 22 and mounting plate 18 and, as seen through air aperture 60, orifice surface 30 is disposed at or near the front edge of stud 16.

Figure 3:
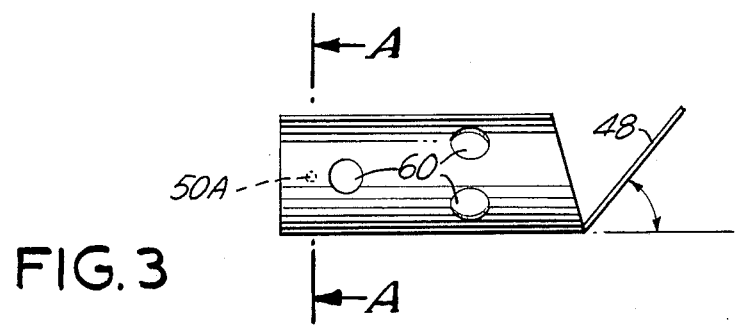
FIG. 3 is a side elevation view of the pilot burner barrel illustrated in FIG. 2.
Figure 4:
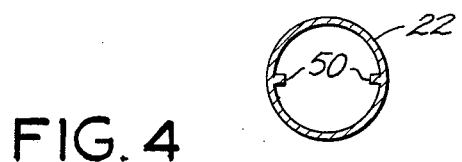
FIG. 4 is a cross section view of the pilot burner barrel illustrated in FIG. 3 taken along lines A—A of FIG. 3.

FIG. 3, a side elevation view of pilot body 22, shows the preferred configuration of the pilot barrel wherein the flame deflector 48 has a greater diameter than the open end of pilot body 22 and is disposed at an angle to the horizontal. 50A designates the location of one of inwardly projecting pins 50. Preferably, pilot body 22 has a cylindrical barrel configuration with two inwardly projecting pins as shown in FIG. 4. FIG. 4, a rearward looking cross sectional view of cylindrical pilot body 22 taken along lines A—A of FIG. 3, shows pins 50 projecting radially inward from the wall of the pilot body.

Figure 5:
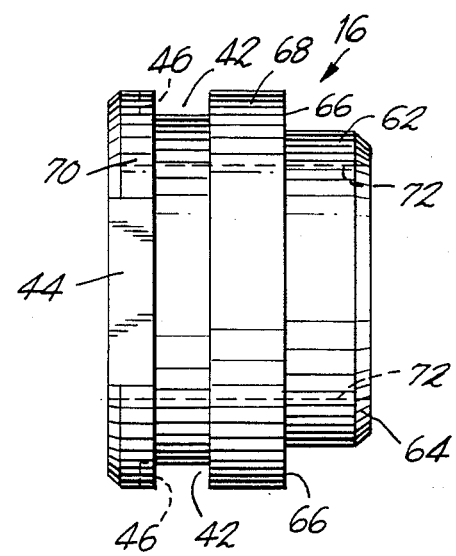
FIG. 5 is a top view of the pilot burner mounting and attachment stud of a pilot burner constructed in accordance with the preferred embodiment of the invention.
Figure 7:
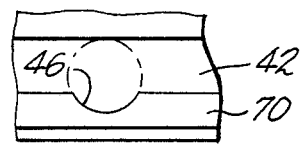
FIG. 7 is a partial section view of the pilot burner mounting stud illustrated in FIG. 6, taken along lines B—B of FIG. 6 and showing a pin detent.

FIG. 5 is a top view of mounting stud 16 separate from mounting plate 18. Stud 16 has a mounting plate engagement sleeve 62 in order to facilitate mounting the stud to the mounting plate, as by pressure fit or by forming back lip 64 to overlap the rear surface of mounting plate 18. Phantom lines 72 indicate the central opening in stud 16 which communicates with a mounting plate aperture in order to threadingly engage the orifice holder. In practice, mounting stud 16 is butted at surface 66 against the front surface of mounting plate 18. The front portion of stud 16 has a generally cylindrical configuration of substantially uniform diameter except for circumferential channel 42, relief or flat areas 44 and detents 46 (indicated in phantom). Thus, the mounting stud base section 68, which seats against mounting plate 18, is of the largest external diameter and front edge section 70 is configured to have the same diameter at all points other than at flat areas 44 and detents 46. Together, stud base section 68 and front edge section 70 define circumferential channel 42. As a practical matter, channel 42 may be formed by cutting into a uniform stud piece, as by turning on a lathe. Similarly, flat areas 44 may be formed by cutting or grinding a flat section to the same depth as channel 42. Detents 46 disposed away from flats 44 may be formed by drilling, to substantially the same depth as channel 42, recesses having a diameter substantially the same as pins 50 and overlapping front edge section 70 and channel 42. In this manner an arc having a diameter similar to pins 50 is formed in front edge section 70, as shown in FIG. 7. Of course, the center of the stud piece may be drilled out and threaded in a conventional manner to complete the mounting stud.

Figure 6:
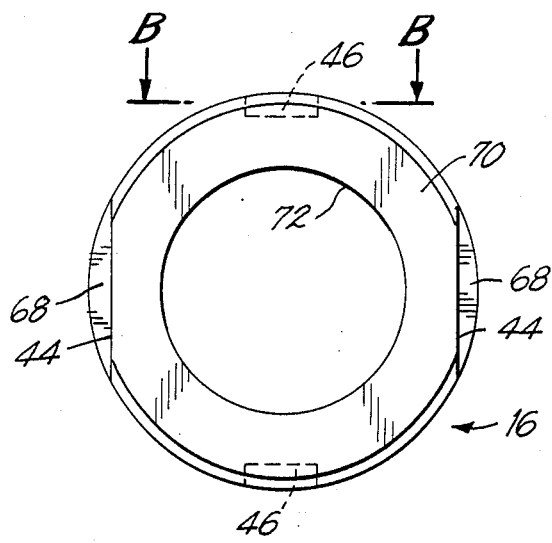
FIG. 6 is a front elevation view of the pilot burner mounting and attachment stud illustrated in FIG. 5, showing mounting stud flat areas.

FIG. 6 shows in front elevation view the mounting stud 16 illustrated in FIG. 5. As there shown, only front edge section 70 is visible except at flat areas 44, where stud base section 68 becomes visible. Detents 46 are shown in phantom. FIG. 7, a partial cross section view of detent 46 taken along line B—B of FIG. 6, illustrates detent 46 as an arc cut out of front edge 70, as by drilling a recess having diameter substantially the same as pins 50 overlapping channel 42 and front edge portion 70.

As best appreciated from FIGS. 1 and 2, pilot body 22 is longitudinally mounted over stud 16 in the partially rotated position shown in FIG. 1 with pins 50 aligned with flat areas 44. Pins 50 traverse flat areas 44 as pilot body 22 is urged toward mounting plate 18 into contact with spring washer 20. After pins 50 are disposed in channel 42 pilot body 22 is rotated in the direction of arrow 52 while exerting longitudinal pressure toward mounting plate 18 to overcome the springing force of spring washer 20. As pilot body 22 is rotated pins 50 are guided through channel 42 to reach detents 46, whereupon the longitudinal pressure on pilot body 22 is released and pins 50 become seated in detents 46 under the opposing springing force of spring washer 20 on pilot body 22. As fully engaged with mounting stud 16, pilot body 22 covers orifice surface 30 and communicates the pilot flame to the tip of pilot body 22. The pilot flame protrudes from the pilot body and is directed upwardly by the flame deflector to ignite the adjacent main gas burner. As stated, flame deflector 48 also protects the pilot flame from being blown out.

As shown and discussed herein, the pilot body of the present invention is preferably provided with two diametrically opposed inwardly projecting pins 50 to engage two diametrically opposed flat areas 44 and two diametrically opposed detents 46 disposed at 90° from flat areas 44. This configuration has proven to be effective and economical, but it is contemplated that other configurations having fewer or more pins, flat areas and detents and different degrees of pilot body rotation and displacement of detents relative to flat areas may be used to obtain substantially the same results in substantially the same manner. It is also contemplated that the pilot body and stud need not be cylindrical, that spring means other than a spring washer could be used, and that the mounting stud could be mounted to the mounting plate other than through an aperture.

Figure 8:
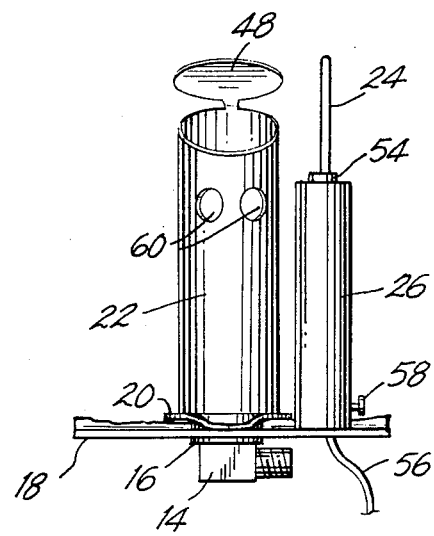
FIG. 8 is a top view of the pilot burner illustrated in FIG. 2.

In addition, by the present invention an improved pilot burner thermocouple configuration is provided. As shown in FIG. 8, a top view of the pilot burner shown in FIG. 2, thermocouple mount 26 is mounted adjacent to but not directly over the pilot body 22. Thus, when thermocouple 24 is mounted in thermocouple mount 26 via thermocouple base 43 and set screw 58 the thermocouple is disposed above and to the side of the pilot flame emanating from the tip of pilot body 22. It has been found that disposing the pilot burner thermocouple above and to the side of the pilot body in this manner prevents improper detection of heat rising from the pilot flame and results in detection by the thermocouple of only a pilot flame of sufficient strength to ignite the main gas burner. However, as the orifice becomes clogged and the pilot flame gradually diminishes below the level necessary to ignite the main gas burner, the pilot flame does not contact the thermocouple and is not detected. Nor is heat rising from a weak pilot flame incapable of igniting the main burner detected. Therefore, the safety circuit preventing activation of the main gas burner in the absence a proper pilot flame properly detects only the presence of a sufficient pilot flame and prevents activation of the main burner whenever the pilot flame is too weak to ignite the main burner. A signal to the poultry farmer indicating pilot failure could also be provided.

Figure 9:
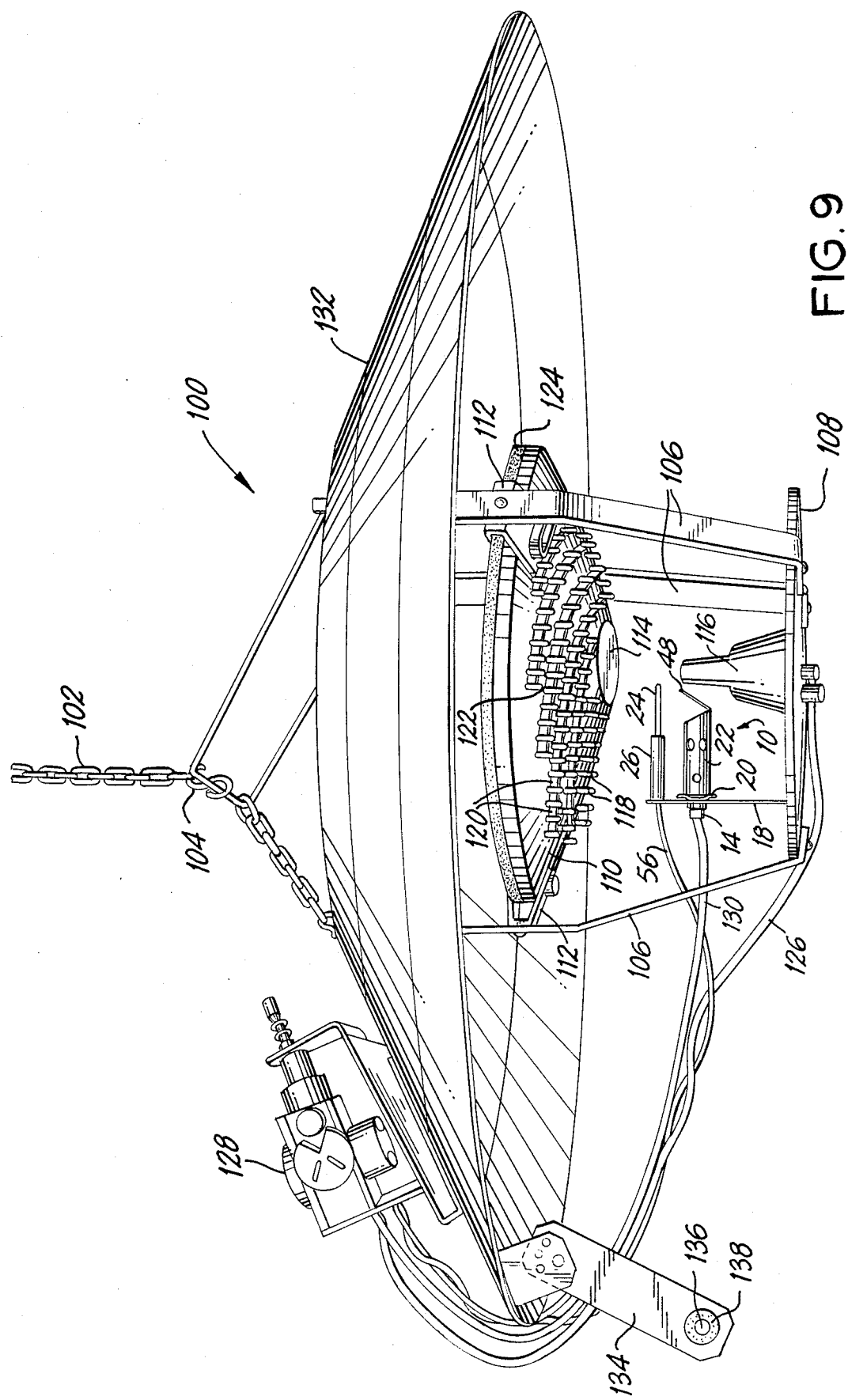
FIG. 9 is a perspective view of a poultry brooder including the pilot burner constructed in accordance with the present invention.

Referring now to FIG. 9, there is shown a poultry brooder 100 generally in accordance with the foregoing U.S. Pat. No. 4,614,166 further including the pilot burner 10 in accordance with the present invention. Poultry brooder 100 is suspended on support chain 102 and is leveled by a leveling hanger 104, such as the leveling hanger available from Safe-glo Products Corp., Springfield, Mass. Leveling hanger 104 supports a poultry brooder frame having upright members 106 attached at their ends to the leveling hanger and gas burner mounting plate 108. An inverted frusto-conical ceramic radiant element 110 is suspended from upright elements 106 by brackets 112 with the flat, closed center 114 of the radiant disposed directly over the main gas burner 116. Ceramic radiant element 110 is provided with protrusions 118 which are preferably interconnected by webs or walls 120 to form spiral passageways 122 in accordance with the foregoing U.S. Pat. No. 4,614,166. Also in accordance with U.S. Pat. Nos. 4,614,166 and 4,658,758 the poultry brooder is preferably provided with an insulating element 124 disposed above ceramic radiant element 110. Gas burner 116 is mounted to gas burner mounting plate 108 and is connected to a main burner gas line 126 which, in turn, is connected to a thermostatic control unit 128. As shown, pilot burner mounting plate 18 is also secured to gas burner support plate 108 so that the preferred horizontal pilot burner 10 is adjacent to the upper, open end of main gas burner 116. More specifically, flame deflector 48 is disposed adjacent to the open end of main gas burner 116 so that a pilot flame emanating from the pilot burner is directed upwardly to ignite the main burner. Pilot burner 10 is connected via the coupling on orifice holder 14 to a pilot burner gas line 130 connected to thermostatic control unit 128. Thermocouple connector 56 is also connected to thermostatic controller 128.

Leveling hanger 104 also supports a canopy roof 132. Canopy roof 132 supports thermostatic control unit 128 and the corresponding adjustable sensor bracket 134 having a heat sensing element 136 secured to the bracket by an insulated grommet 138.

Although specifically described herein in relation to the preferred poultry brooder described and claimed in the foregoing U.S. Pat. No. 4,614,166, the poultry brooder pilot burner in accordance with the present invention may also be used with other poultry brooders not in conformance with the foregoing patent. In addition, the removable pilot body of the present invention could be used to advantage with a pilot burner of vertical configuration in order to prevent accidental displacement of the pilot body.

As will be readily appreciated, the poultry brooder and, more particularly, the poultry brooder pilot burner in accordance with the present invention obtains remarkable advantages over heretofore known poultry brooder pilot burner configurations. First, as the pilot flame gradually diminishes during orifice clogging, the novel location of the pilot burner thermocouple according to the present invention enables the safety circuit to distinguish between a normal pilot flame sufficient to ignite the main burner and a weak pilot flame incapable of igniting the main burner. Consequently, the safety circuit may trigger a fault signal and prevent any attempt to light the main burner not only when the pilot flame becomes extinguished but also when the pilot flame is too weak to ignite the main burner.

Second, although the preferred horizontal pilot burner is less susceptible to orifice clogging than a vertical burner, when such clogging occurs the poultry farmer can readily access the orifice merely by rotating the pilot body 22 relative to the mounting stud 16 until pins 50 align with flat areas 44, whereupon the pilot body can be longitudinally removed from the mounting stud. Remarkably, the pilot body is removed to gain access to the orifice surface without any tools and without disconnecting any gas line couplings. After removal of the pilot body the orifice can be accessed from the front of the pilot burner to be cleaned by wiping the orifice surface or inserting a fine wire into the orifice. Remarkably, should it be necessary to remove the orifice from orifice holder 14 this can also be accomplished from the front of the pilot burner without removing the orifice holder from the back of the mounting plate and, consequently, without affecting any gas line couplings.

Third, after the orifice is cleaned or replaced the pilot burner body is longitudinally mounted over stud 16 with pins 50 aligned with flat areas 44. The pilot body is rotated with pins 50 in channel 42 until the pins engage and are urged into detents 46 by the spring pressure of spring washer 20 against the pilot body. Since no gas line couplings are affected by the foregoing steps the poultry farmer advantageously is spared the tedious but critical step of testing gas line seals upon reassembly.

Thus, the poultry brooder pilot burner in accordance with the present invention remarkably provides convenient access to the orifice for cleaning and/or replacement without disconnecting any gas connections.

To the extent not already indicated, it will be understood by those of ordinary skill in the art that any one of the various specific embodiments herein described and illustrated may be further modified to incorporate features shown in other of the specific embodiments, as desired.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. In a poultry brooder including a main gas burner, the improvement comprising a pilot burner having:
   mounting plate means secured to said brooder;
   orifice holder means for receiving and supporting an orifice, said orifice holder means being configured and dimensioned to be connected to a gas source;
   a cylindrical pilot burner mounting stud attached to said mounting plate means, said mounting stud having an annular channel and being configured and dimensioned to engage and support said orifice holder means such that said orifice is exposed;
   a pilot body removably attached to said mounting stud, said pilot body having at least one inwardly projecting mounting pin to engage said mounting stud annular channel, said removable pilot body being disposed over said orifice when attached to said mounting stud and extending horizontally adjacent to the main gas burner.

2. The poultry brooder pilot burner in accordance with claim 1 wherein said pilot body has a plurality of air apertures therethrough.

3. The poultry brooder pilot burner according to claim 1 wherein said pilot body has a cylindrical barrel shape.

4. The poultry brooder pilot burner according to claim 3 wherein said mounting stud further includes mounting pin access means facilitating entry of said mounting pin into said annular channel as said pilot body is longitudinally mounted onto said mounting stud.

5. The poultry brooder pilot burner according to claim 4 wherein said pin access means further comprises at least one flat area on said stud connecting said channel to a tip of the cylindrical stud over which said pilot body is mounted.

6. The poultry brooder pilot burner according to claim 5 wherein said mounting stud includes at least one mounting pin detent in communication with said channel, said detent receiving said mounting pin when said pilot body is longitudinally mounted over said stud and rotated relative to said stud.

7. The poultry brooder pilot burner according to claim 6 wherein two mounting pins are provided diametrically opposed on said pilot body.

8. The poultry brooder pilot burner according to claim 7 wherein said pin access means further comprise two flat areas diametrically opposed on said cylindrical stud.

9. The poultry brooder pilot burner according to claim 8 wherein two pin detents are provided diametrically opposed on said cylindrical stud body.

10. The poultry brooder pilot burner according to claim 9 wherein said pin detents are disposed on said stud at 90° from said flat areas.

11. The poultry brooder pilot burner according to claim 9 further comprising spring means for urging said pilot body away from said mounting plate means, thereby urging said pins into said detents when said pilot body is mounted over said cylindrical stud.

12. The poultry brooder pilot burner according to claim 11 wherein said spring means further comprise a spring washer disposed between said mounting plate and said pilot body.

13. The poultry brooder according to claim 1 wherein said mounting stud has at least one flat area corresponding to said pin such that said pin traverses said flat area to reach said channel as said pilot body is longitudinally mounted over said mounting stud, said pin travelling in said channel as said pilot body is rotated relative to said mounting stud.

14. The poultry brooder according to claim 13 wherein said mounting stud is provided with at least one pin detent, said pin engaging said detent after said pilot body has been longitudinally mounted over said stud and rotated relative to said stud.

15. The poultry brooder according to claim 14 further comprising spring means for urging said pilot body longitudinally away from said stud, thereby urging said pin into said pin detent when said pilot body is mounted over said stud.

16. The poultry brooder according to claim 15 wherein said mounting stud is attached to a mounting plate secured to said frame, said spring means further comprising a spring washer disposed between said mounting plate and said pilot body.

17. The poultry brooder according to claim 1 further comprising safety circuit means for preventing any attempt to ignite the main gas burner where said pilot burner is incapable of igniting the main gas burner, said safety circuit means including a thermocouple disposed adjacent but not directly above said horizontally extending pilot body for detecting the presence of only such pilot burner flame as is capable of igniting the main gas burner.

18. In a poultry brooder including a main gas burner, the improvement comprising a pilot burner having:
mounting plate means secured to said brooder;
orifice holder means for receiving and supporting an orifice, said orifice holder means being configured and dimensioned to be connected to a gas source;
a pilot burner mounting stud attached to said mounting plate means, said mounting stud consisting of a cylindrical stud having an annular channel configured and dimensioned to receive at least one inwardly projecting mounting pin on said pilot body, said mounting stud being configured and dimensioned to engage and support said orifice holder means such that said orifice is exposed;
a pilot body removably attached to said mounting stud, said removable pilot body being disposed over said orifice when attached to said mounting stud and extending adjacent to the main gas burner.

19. The poultry brooder pilot burner according to claim 18 wherein said pilot body further comprises a cylindrical barrel.

20. The poultry brooder pilot burner according to claim 19 wherein said mounting stud further includes mounting pin access means facilitating entry of said mounting pin into said annular channel as said pilot body is longitudinally mounted onto said mounting stud.

21. The poultry brooder pilot burner according to claim 20 wherein said pin access means further comprises at least one flat area on said stud connecting said channel to a tip of the stud over which said pilot body is mounted.

22. The poultry brooder pilot burner according to claim 6 wherein said mounting stud includes at least one mounting pin detent in communication with said channel, said detent receiving said mounting pin when said pilot body is longitudinally mounted over said stud and rotated relative to said stud.

23. The poultry brooder pilot burner according to claim 22 wherein two mounting pins are provided diametrically opposed on said pilot body.

24. The poultry brooder pilot burner according to claim 23 wherein said pin access means further comprise two flat areas diametrically opposed on said cylindrical stud.

25. Poultry brooder pilot burner according to claim 24 wherein two pin detents are provided diametrically opposed on said cylindrical stud body.

26. The poultry brooder pilot burner according to claim 25 wherein said pin detents are disposed on said stud at 90° from said flat areas.

27. The poultry brooder pilot burner according to claim 25 further comprising spring means for urging said pilot body away from said mounting plate means, thereby urging said pins into said detents when said pilot body is mounted over said stud.

28. The poultry brooder pilot burner according to claim 27 wherein said spring means further comprises a spring washer disposed between said mounting plate and said pilot body.

29. The poultry brooder pilot burner according to claim 19 wherein said pilot body extends horizontally from said mounting stud and further includes a flame deflector disposed at an angle across an open end of said cylindrical barrel, said flame detector having a diameter greater than the open end of said barrel.

30. A poultry brooder comprising:
a canopy roof secured to a brooder frame;
a ceramic heat radiating element suspended beneath said canopy roof on said frame;
main gas burner means disposed under said ceramic element for heating said ceramic element, said main gas burner means being attached to said frame and connected to a main burner gas source;
a pilot burner supported by said frame adjacent to said main gas burner means for igniting said main gas burner means, said pilot burner including a cylindrical pilot burner mounting stud having an annular channel, said mounting stud being configured and dimensioned to receive and engage (i) an orifice holder connected to a pilot burner gas source and having an orifice and (ii) a removable pilot body having at least one inwardly projecting pin to engage said annular channel, said removable pilot body mounting over said stud such that said pilot body surrounds said orifice and extends horizontally adjacent to said main gas burner means; and controlling means for controlling the supply of gas from said main burner gas source to said main gas burner means.

31. A poultry brooder comprising:

a canopy roof secured to a brooder frame;

a ceramic heat radiating element suspended beneath said canopy roof on said frame;

main gas burner means disposed under said ceramic element for heating said ceramic element, said main gas burner means being attached to said frame and connected to a main burner gas source;

a pilot burner supported by said frame adjacent to said main gas burner means for igniting said main gas burner means, said pilot burner including a pilot burner mounting stud configured and dimensioned to receive and engage (i) an orifice holder connected to a pilot burner gas source and having an orifice, and (ii) a removable pilot body adapted to be mounted over said stud such that said pilot body surrounds said orifice and extends adjacent to said main gas burner means, said mounting stud consisting of a cylindrical stud having an annular channel configured and dimensioned to receive at least one inwardly projecting pin on said said pilot body, said pin travelling in said channel as said pilot body is rotated relative to said mounting stud; and controlling means for controlling the supply of gas from said main burner gas source to said main gas burner means.

32. The poultry brooder according to claim 31 wherein said mounting stud has at least one flat area corresponding said pin such that said pin traverses said flat area to reach said channel as said pilot body is longitudinally mounted over said mounting stud.

33. The poultry brooder according to claim 32 wherein said mounting stud is provided with at least one pin detent, said pin engaging said detent after said pilot body has been longitudinally mounted over said stud and rotated relative to said stud.

34. The poultry brooder according to claim 33 further comprising spring means for urging said pilot body longitudinally away from said stud, thereby urging said pin into said pin detent when said pilot body is mounted over said stud.

35. The poultry brooder according to claim 34 wherein said mounting stud is attached to a mounting plate secured to said frame, said spring means further comprising a spring washer disposed between said mounting plate and said pilot body.

36. The poultry brooder according to claim 35 further comprising safety circuit means for preventing any attempt to ignite said main gas burner where said pilot burner is incapable of igniting said main gas burner, said safety circuit means including a thermocouple disposed adjacent but not directly above said pilot burner for detecting the presence of only such pilot burner flame as is capable of igniting said main gas burner.

* * * * *